United States Patent [19]
Takahashi

[11] Patent Number: 4,823,376
[45] Date of Patent: Apr. 18, 1989

[54] TIME LIMITED DATA COMMUNICATION SYSTEM

[75] Inventor: Shuichi Takahashi, Sagamihara, Japan

[73] Assignee: Ricoh Company, Ltd., Tokyo, Japan

[21] Appl. No.: 942,373

[22] Filed: Dec. 16, 1986

[30] Foreign Application Priority Data

Dec. 16, 1985 [JP] Japan .................................. 60-281005
Dec. 19, 1985 [JP] Japan .................................. 60-284312
Mar. 14, 1986 [JP] Japan .................................. 61-54868

[51] Int. Cl.⁴ .................. H04M 17/00; H04M 15/02; H04M 11/00
[52] U.S. Cl. .................................... 379/100; 358/256; 379/132
[58] Field of Search ...................... 379/100, 132, 155; 358/256, 257

[56] References Cited

U.S. PATENT DOCUMENTS

3,112,361  11/1963  Kubota et al. .................. 358/257
4,198,545  4/1980   Haist et al. ..................... 379/132
4,434,326  2/1984   Koeck et al. .

FOREIGN PATENT DOCUMENTS

134693  3/1985  European Pat. Off. ............ 379/132

54-106110  8/1979  Japan .
57-99858   6/1982  Japan .
59-175278  10/1984 Japan .................................. 379/100

*Primary Examiner*—Keith E. George
*Attorney, Agent, or Firm*—Oblon, Fisher, Spivak, McClelland & Maier

[57] ABSTRACT

A pay facsimile machine, which is similar to a pay telephone, is allowed to be connected to a network for a communication time period, the length of which is determined depending on the amount of money deposited. When the end of the communication time period approaches, a warning signal is given to the user, and if an additional deposit of money is made, the communication time period is extended; however, if no additional deposit is made, the connection is automatically disconnected. If an original document is half transmitted when such a disconnection has happened, the original document is held as it is in a reading unit. When the transmission is resumed, the original document is transported in a forward direction, or, alternatively, is first moved backward for a predetermined distance and then moved forward. A pay facsimile machine is also preferably provided with a remaining time indicating device which indicates the remaining amount of the communication time period either visually or audibly.

8 Claims, 10 Drawing Sheets

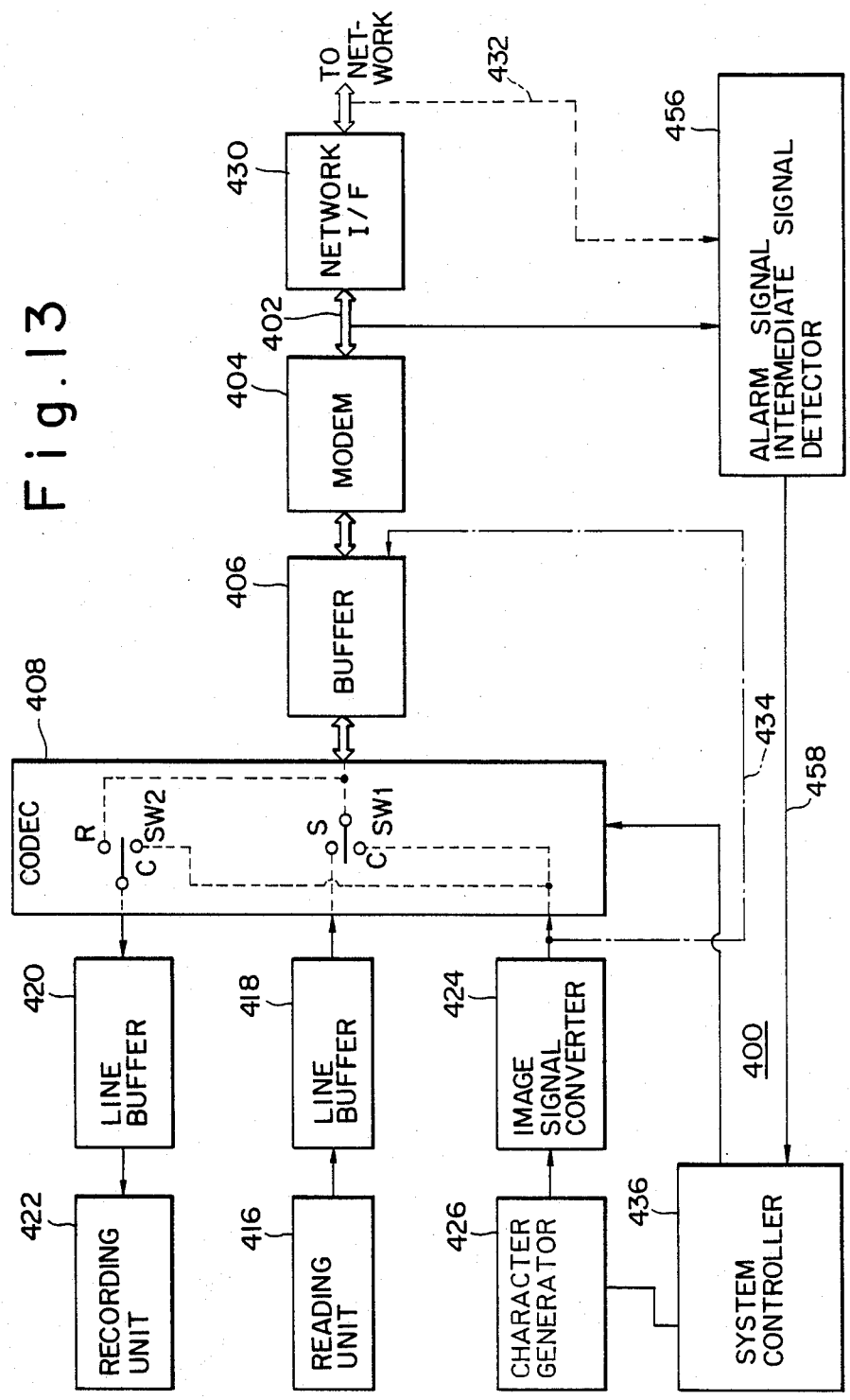

Fig. 14a  IMAGE INFORMATION SIGNAL
Fig. 14b  ALARM SIGNAL
Fig. 14c  DETECTOR SIGNAL

TIME LIMITED DATA COMMUNICATION SYSTEM

BACKGROUND OF THE INVENTION

1. Field of the Invention

This invention generally relates to a data communication system having a unit time period for allowing to carry out data communication, such as a pay public telephone system, and, in particular, to a data communication apparatus, such as a facsimile machine, suitable for use in such a data communication system.

2. Description of the Prior Art

Typically, a time limited data communication system with or without wire includes, for example, a public pay telephone system using coin or a card and a multi-access channel (MCA) system. The former is the case with wire and the latter is the case without wire. In such a data communication system, the connection is forcibly disconnected when a predetermined unit time period for communication has elapsed. For example, as well known, in the case of a pay public telephone system, a unit time period for communication is predetermined and a total length of time capable of keeping communication alive depends on the total amount of money accumulated by depositing one or more coins. In this case, if the remaining time has reached a predetermined value, a warning audible signal is supplied to a receiver held by the user. In this case, if an additional one or more coins are deposited, the communication time period is extended depending again on the amount of money thus deposited. If no additional coins are deposited, then the connection is automatically disconnected when the time period determined by the deposited coins has elapsed.

A facsimile machine may be used as a terminal in such a public pay telephone system. In this case, however, there is a chance that the connection is disconnected automatically while the communication is still in progress, e.g., while one of a plurality of pages of original documents is being transmitted. If this happens, then the operator must go through the calling and connecting procedure again in order to transmit the remaining pages. This procedure would involve transmission of the telephone number of the destination terminal by dialing or pressing buttons, setting of the remaining originals to be transmitted, and setting of transmission conditions, such as line density. Such a retransmitting procedure is quite cumbersome to the operator, and it is also possible that various errors could occur because the operator is require to exercise various cares. Therefore, there has been a need to provide an improved data communication system and a terminal for use therewith, which allows the user to transmit desired information without any problem and with ease, reliability and high efficiency, even if communication is automatically discontinued when an allowable communication time period has elapsed.

SUMMARY OF THE INVENTION

It is therefore a primary object of the present invention to provide an improved, time limited data communication system which allows the operator to transmit data with ease even if the data to be transmitted is relatively large in amount.

Another object of the present invention is to provide an improved data communication apparatus suitable for use in a time limited data communication system.

A further object of the present invention is to provide a data communication apparatus which is suitable to use as a terminal of a time limited data communication system and which allows the operator to transmit data with ease and high reliability.

A still further object of the present invention is to provide a facsimile machine which can be advantageously used as a terminal of a public pay telephone system.

Other objects, advantages and novel features of the present invention will become apparent from the following detailed description of the invention when considered in conjunction with the accompanying drawings.

BRIEF DESCRIPTION OF THE DRAWINGS

FIG. 13 is a block diagram showing a data communication apparatus suitable for use in a time limited data communication system and constructed in accordance with another embodiment of the present invention;

FIGS. 14a through 14c are schematic illustrations showing various waveforms of signals appearing at various points in the structure shown in FIG. 13;

DESCRIPTION OF THE PREFERRED EMBODIMENTS

Figure 1:
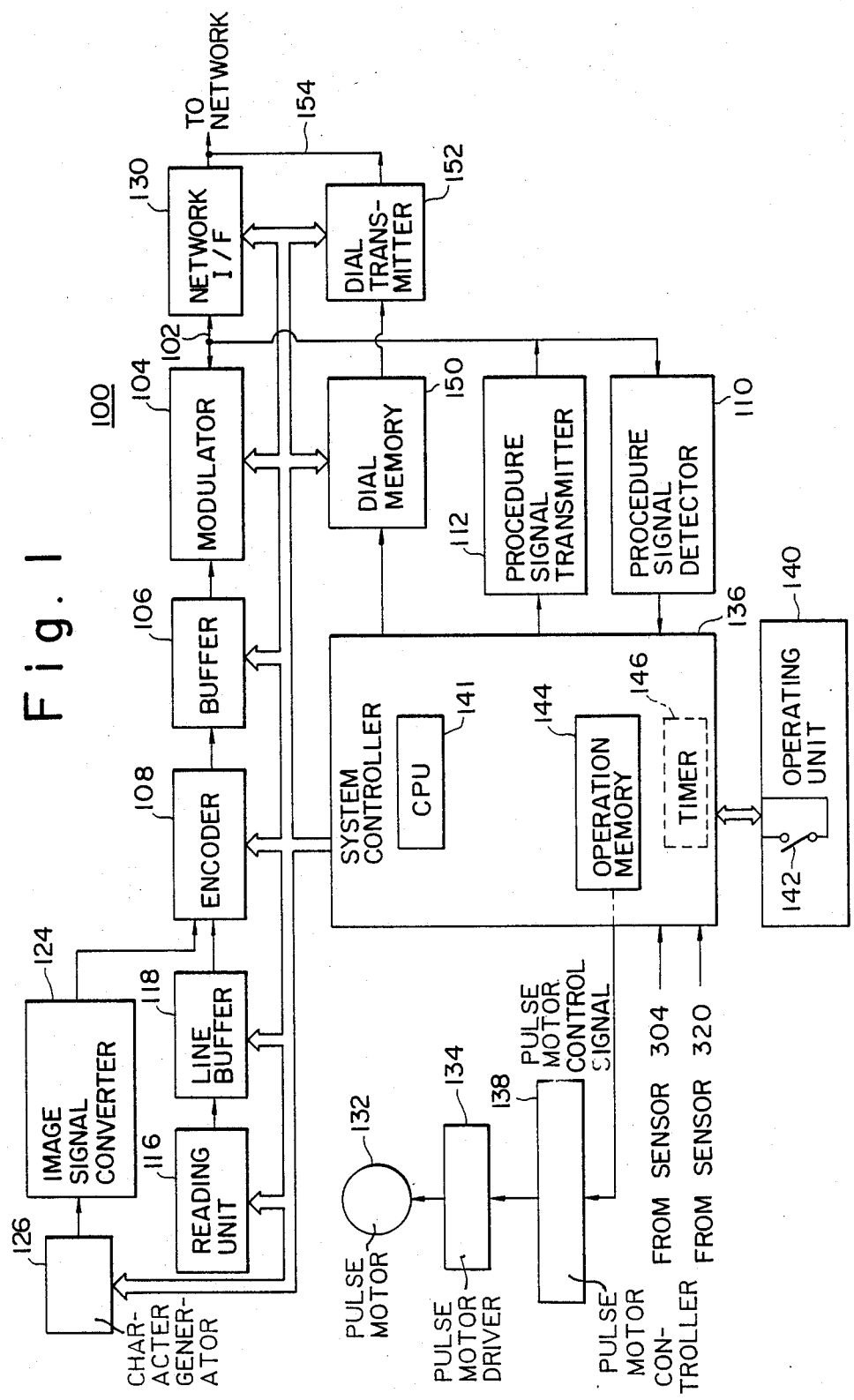
FIG. 1 is block diagram showing a data communication apparatus suitable for use in a time limited data communication system and constructed in the form of a facsimile machine in accordance with one embodiment of the present invention.

At the outset, it should be noted that the term "data" used in the present specification includes not only digital data in a limited sense, but also analog image information, such as facsimile information, and audio information.

As described briefly before, facsimile communication can be carried out by connecting a facsimile machine to a public pay telephone system using coins and/or cards. Moreover, a facsimile machine may be provided with a mechanism for limiting a communication time period depending on the amount of money calculated from the deposited coins or an inserted card. In the latter case, a facsimile function and a public pay telephone function using coins and/or cards are integrated into a single apparatus which may be made available as a public communication terminal for facsimile communication and audio communication. In other words, such a combined terminal apparatus may be used as a public pay telephone for talking to somebody at a remote place or as a public pay facsimile machine for transmitting image data of an original document to another facsimile machine at a remote place. In such a combined system, the communication time period depends on the amount of money calculated from the deposited coins or recorded on the inserted card. When the remaining communication time period has reached a predetermined value, a warning signal, typically in the form of sound, is supplied to the user. If the user wishes to further continue the communication, then additional coins must be deposited; otherwise, the communication is automatically discontinued upon termination of the remaining time period.

In a typical prior art facsimile machine, if the communication is automatically discontinued while an original document is being optically read at the original document reading section, the original document is automatically discharged from the reading section. If the original document is discharged in this manner with part thereof not read, it is impossible to determine which part of the original document remains to be read when it is desired to retransmit the image information of this document. In addition, in accordance with this prior art, in order to transmit the remaining image information, the original document must be again set in the optically reading section, followed by the steps of transmitting the telephone number of a destination station by dialing or pressing buttons, etc.

In accordance with one aspect of the present invention, when the communication is discontinued automatically while optically reading an original document because a communication time period has elapsed, the original document being read is held as it is in the reading section. And, then, if it is desired to transmit the remaining portion of the original document, it can be done by following a procedure which is less complicated than the procedure required to establish connection for the first time. With such a simplified procedure, which may require to push one or more buttons, the remaining portion of the original document can be transmitted to the same destination terminal.

Referring now to FIG. 1, there is shown in block form a facsimile machine 100 constructed in accordance with one embodiment of the present invention. As shown, the facsimile machine 100 includes a network interface (I/F) 130 through which the present facsimile machine 100 is connected to a transmission network, such as a MCA communication network having temporal constraints in using a radio wave or a public telephone network which allows to continue communication for a time period determined by deposited coins or an inserted telephone card. It is to be noted, however, that the present invention is equally applicable to any other communication system, having temporal restrictions in usage, with or without wire.

A signal line 102 extends from the network interface 130 to an encoder 108 through a modulator 104 and a buffer 106 which serves as a memory for storing facsimile data to be transmitted temporarily. The modulator 104 is a modulating device for modulating a facsimile signal to be transmitted according to a predetermined modulating method. The encoder 108 converts the facsimile signal into frames which are then subjected to data compression according to a predetermined encoding method. The facsimile data to be transmitted is obtained by optically reading an original document 300 line by line by an image scanner having a plurality of photoelectric elements 324 arranged in the form of a single array (see FIGS. 3 and 4) provided in a reading unit 116 in the form of raster scanning. The facsimile data thus obtained is then stored into a line buffer 118. The data in the line buffer 118 is then transferred to the encoder 108 in sequence and then to the buffer 106.

Figure 3:
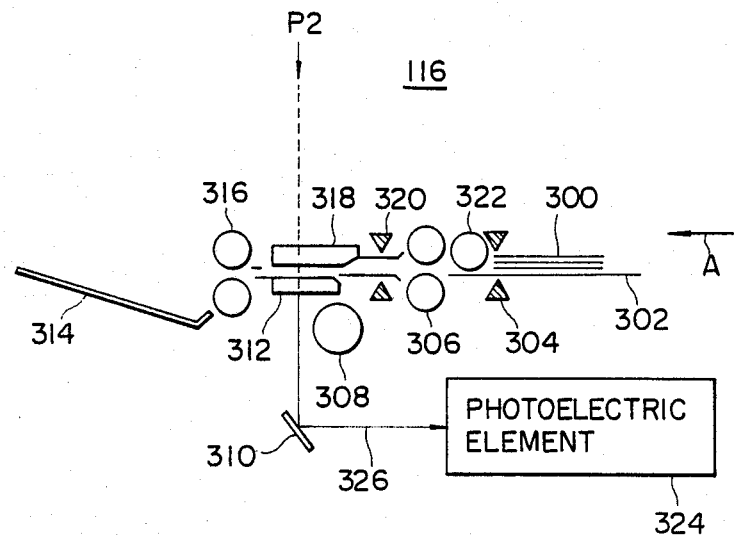
FIG. 3 is a schematic illustration showing an original reading section in the apparatus shown in FIG. 1.

As shown in FIG. 3, the optical reading unit 116 includes a tray 302 for placing thereon a plurality of original documents 300 in the form of a stack. The original documents 300 are separated and fed one by one from the top-most document by means of a separating roller 322 and then transported toward an optical reading location P2 by means of a transporting roller 306. At the reading location P2, a fluorescent lamp 308 is disposed below a target glass plate 312, and the light emitted from the lamp 308 is reflected by the original document 300 passing through the reading location P2 and the reflected light is redirected by a mirror 310 to impinge upon the array of photoelectric elements 324. An original document holding plate 318 is disposed above the target glass plate 312 to define a gap therebetween, and the original document 300 moves through this gap to be finally discharged onto a discharge tray 314 by means of a discharge roller 316.

As described above, the original document 300 is transported in the transporting direction indicated by the arrow A by means of the transportation roller 306 driven to rotate by a pulse motor (PM) 132. The pulse motor 132 is driven by a pulse motor driver 134 which in turn is controlled by a pulse motor controller 138 under the control of a system controller 136. As shown in FIG. 3, an original document sensor 304 is disposed immediately in front of the separating roller 322 with respect to the transporting direction of the original document 300. The original document sensor 304 is, for example, preferably comprised of a photo-coupler or a limit switch, and it serves to detect the presence of the stack of original documents 300 or any remaining original document to be transmitted next. Another original document sensor 320 of the photo interrupter type is disposed in the downstream of the transporting roller 306 with respect to the transporting direction.

Figure 4:
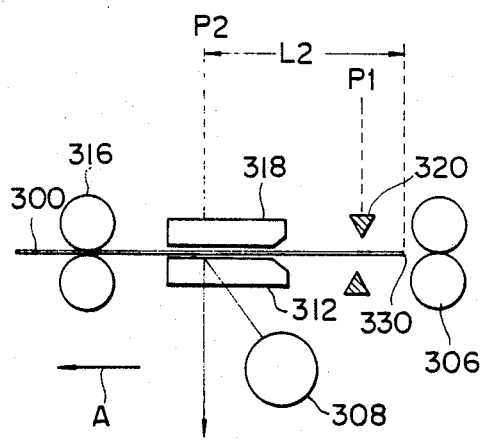
FIG. 4 is a schematic illustration showing on an enlarged scale part of the structure shown in FIG. 3.

As shown in FIG. 4 on a somewhat enlarged scale, another original document sensor 320 is disposed at a location P1 which is upstream of the reading location P2 with respect to the transporting direction A over a predetermined distance for detecting whether the original document 300 to be read extends beyond the predetermined distance. This detection is carried out by determining whether or not the trailing edge 330 of the original document 300 being read is located at the sensor 320 or not based on an output from the sensor 320 at the time when a predetermined time period has elapsed from the time of initiation of communication. If the trailing edge 330 of the original document 300 is detected, the system controller 136, which will be described more in detail later, can determine the fact that the message to be transmitted will come to an end if the original document 300 is transported by the number of lines in the auxiliary scanning direction (i.e., transporting direction and perpendicular to the optical scanning direction, which is often called the main scanning direction) corresponding to the predetermined distance.

In the present embodiment, use is made of the sensor 320 as a reference for determining the original document reading location P2 so as to determine the amount of remaining information of the original document 00 to be transmitted. However, alternatively, any other means may be used for determining the amount of remaining information of the original document 300 to be transmitted by providing any other suitable detecting means at an appropriate location. If desired, the illustrated facsimile machine 100 may be provided with a facsimile data receiving function for receiving facsimile data transmitted from a transmitter through the network and having the thus received facsimile data recorded on a recording medium. However, since such a receiving and recording function is not required for understanding of the present invention, its detailed description will be omitted.

In the facsimile machine 100 shown in FIG. 1, a character generator (CG) 126 is provided as connected to the encoder 108 through an image signal converter 124 which has a function of converting a character pattern data generated from the character generator 126 into an image signal. In the case when the character data generated within the apparatus 100 is to be transmitted through the network interface 130, an output from the image signal converter 124 is transferred to the buffer 106 through the encoder 108. The character generator 126 may be an ordinary character generator for generating a character pattern data in response to a character data supplied from the system controller 136.

The signal line 102 is also connected to a procedure signal detector 110 and to a procedure signal transmitter 112. The procedure signal detector 110, for example, is provided with a function of detecting a procedure signal which is transmitted from a transmitting station according to a facsimile transmission control procedure, such as the G3 facsimile transmission control procedure by the CCITT recommendations, and received at the network interface 130. On the other hand, the procedure signal transmitter 112 is provided with a function of transmitting a procedure signal to the network interface 130 for transmitting data to a destination station from the network interface 130 according to a facsimile communication control procedure under the control of the system controller 136.

The various functions and operations within the facsimile machine 100 are integrally controlled by the system controller 136. The system controller 136 includes a central processing unit (CPU) 141 and an operating memory 144 for storing operating information which will be required to resume the communication which has been discontinued because the communication time period has elapsed, as will be described in detail later. The operating information to be stored in the operating memory 144, for example, includes a set value of line density for transmission. Also provided as connected to the system controller 136 is a dial memory 150 for storing the address information, such as telephone number, of a destination station, to which facsimile data is to be transmitted. The dial memory 150 is connected to a dial transmitter 152 which has its output connected to the communication network. The dial transmitter serves to transmit a destination selection signal in the form of a dial pulse or MF signal to the network in accordance with the data stored in the dial memory 150.

The system controller 136 includes a timer 146 which is activated when the communication start condition has been established by calling the destination station and counts the elapsing of a predetermined communication time period T (FIG. 2) allocated to the communication. Also provided as connected to the system controller 136 is an operating unit 140 which is provided with various manual operating buttons, for example, for start transmission, stop transmission, reset, power up/down, copy command and numeric keys for inputting the destination address, such as telephone number, of the destination station. In addition, in the present embodiment, the operating unit 140 is provided with a retransmission switch 142 which provides a command to resume communication by restablishing the connection to the destination station, which has been disconnected due to lack of time. The operating unit 140 is preferably provided with a display unit for displaying an indication to the operator to the effect that the connection with the destination station has been disconnected due to lack of the communication time period even if there still remains original documents 300 to be transmitted. Alternatively or in addition, the operating unit 140 may be provided with a device for providing an audible warning signal when such an indication is displayed.

Figure 5:
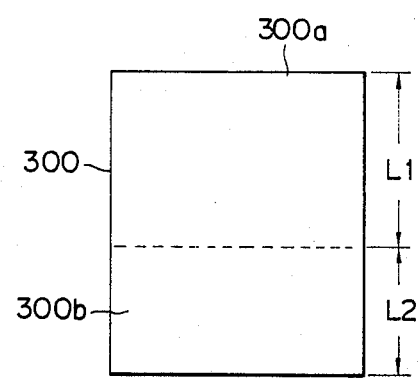
FIG. 5 is a schematic illustration showing an example of an original document whose information is to be read and transmitted.

In a communication system whose availability for communication is limited for a predetermined time period, such as a public pay telephone system, there is a case in which the communication is forcibly terminated even if the transmission of one unit of message is in progress. In the present embodiment, for example, as shown in FIG. 5, if the transmission of the original document 300 has been discontinued after having transmitted a portion 300a over a length L1 from its leading edge, when the connection to the destination station has been restored, the remaining portion 300b having a length L2 can be transmitted to the destination station by operating the retransmission switch 142 of the operating unit 140. In this case, at the destination station which receives the image information of this remaining portion 300b, the image data of this remaining portion 300b may be recored on the same sheet of paper on which the image data of the leading portion 300b has been recorded or on a separate sheet of paper.

In the present embodiment, in the case of transmitting the image information of the latter half portion 300b, additional information in the form of a letter or symbol indicating the fact that the remaining portion 300b succeeds the former portion 300a is formed as image information and transmitted in advance. Thus, at the destination station, this additional information is recorded on a sheet of recording paper prior to recording of the latter half portion 300b. It may be alternatively so structured that part of the latter half portion 300b is replaced with this additional information when recorded on a sheet of paper. With this structure, the operator at the destination station can recognize the reception of the remaining portion 300b which is subsequent to the former portion 300a. If the original document 300 is very long and it requires a communication time period beyond a predetermined communication time period T, the above-described transmission operation subsequent to discontinuance of communication may be repeated as many times as necessary until all of the image data has been transmitted.

Figure 2:
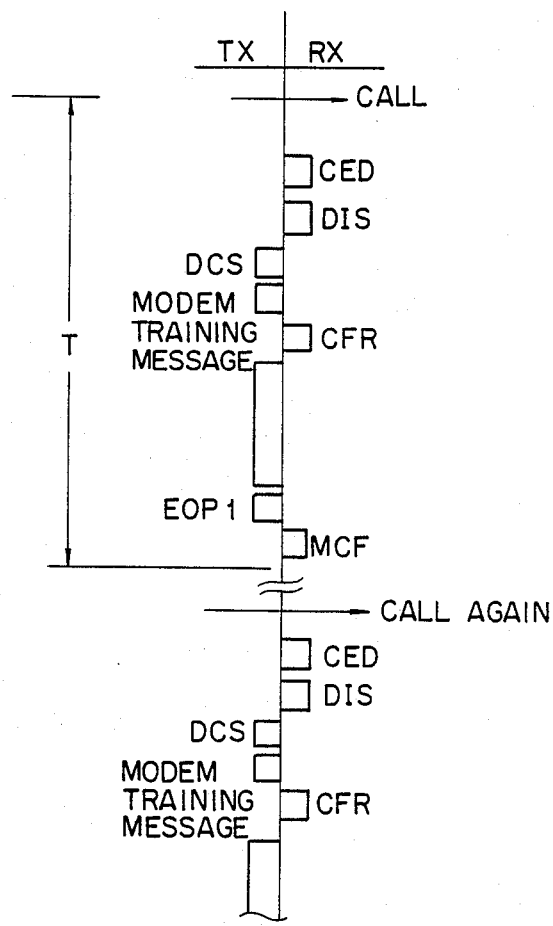
FIG. 2 is a flow chart showing a sequence of steps of facsimile transmission in accordance with the G3 facsimile transmission control procedure of the CCITT recommendations using the apparatus shown in FIG. 1.

Now, referring to FIG. 2, it will be described as to the sequence of steps for carrying out typical facsimile communication for a plurality of pages of original documents in accordance with the G3 facsimile communication control procedure of CCITT recommendations using the present facsimile machine. In this case, the present facsimile machine 100 serves as a transmitter TX. A receiver RX to which data is transmitted from the present transmitter TX may be comprised of the facsimile machine 100 shown in FIG. 1 or any other facsimile machine. When carrying out facsimile communication, in the first place, the numeric keys of the operating unit 140 are operated to input the identification number, such as telephone number, of the receiver RX. In addition, for example, the line density for transmission is set at 3.85 lines/mm or 7.7 lines/mm. The various information thus set is fed into the system controller 136 so that the identification number of the receiver is stored into the dial memory 150 and the line density information is stored into the operating memory 144.

Under the control of the system controller 136 of the facsimile machine 100 serving as a transmitter TX, the network interface 130 activates its connection to the network and causes the dial transmitter 152 to transmit a selection signal to the network based on the information stored in the dial memory 150. Then, a call is sent to the receiver RX from the procedure signal transmitter 112 through the network interface 130 under the control of the system controller 136. This sending of a call can be carried out automatically, if desired. In response to Station Identification) signal and then a DIS (Digital Identification) signal to the transmitter TX. In a manual mode, calling by an audio signal from the transmitter TX is carried out and an operating button is operated as a response at the receiver RX.

Upon receipt of the CED signal transmitted from the receiver RX, the operator at the transmitter TX operates the start button of the operating unit 140. Then, the system controller 136 of the transmitter TX activates the timer 146, so that the counting of a communication time period is initiated. The procedure signal detector 110 of the transmitter TX detects the CED and DIS signals, and, in response thereto, the system controller 136 sends a DCS (Digital Command) signal in a similar manner as described above. Thereafter, in accordance with an ordinary facsimile communication control procedure, a predetermined MODEM training pattern signal is transmitted to the receiver RX, thereby carrying out the training of a MODEM of the receiver RX. Upon completion of the training by the receiver RX, a CFR (Reception Preparation Confirmation) signal is transmitted to the transmitter TX from the receiver RX.

At the transmitter TX, when the CFR signal is detected by the procedure signal detector 110, the system controller 136 controls the pulse motor controller 138 to drive the pulse motor 134 of the reading unit 116 and transfers the line density set value stored in the operation memory 144 to the pulse motor controller 138. Accordingly, the optical reading of the image information of the original document 300 is initiated at the line density thus set in the pulse motor controller 138. The image information or message optically read from the original document by the array of photoelectric elements 324 is passed through the line buffer 118, encoder 108, buffer 106 and modulator 104, so that there is obtained compressed image information arranged in the form of transmission frames which is then transmitted to the network through the network interface 130.

At the receiver RX, the message received is demodulated and deframed to reconstruct the original image information which is then used in recording on a sheet of recording paper as a hard copy. In general, at the beginning of such recording at the receiver, such information as source of transmission or transmitter and date and time of transmission. For this purpose, a source of transmission display function as disclosed in the Japanese Pat. Publication No. 54-106110 may be advantageously applied. At this time, the system controller 136 causes the encoder 108 to be connected to the image signal converter 124. Regarding the data of source of transmission, a necessary message is formed under the commands from the system controller 136 or timer 146 of the transmitter TX, developed as a dot pattern data by the character generator 126 and transmitted. At the receiver RX, this is recorded on a sheet of recording paper similarly as an ordinary facsimile message.

In this manner, a unit of message information, i.e., a single page of image information message in the present embodiment, is transmitted from the transmitter TX to the receiver RX. If there is no subsequent original document to be transmitted, the system controller 136 of the transmitter TX transmits an EOP (End Of Procedure) signal to the receiver RX in a termination processing, and, in response thereto, the receiver RX transmits an MCF signal to the transmitter. Upon reception of the MCF signal, the transmitter TX transmits a DCN (Disconnect Command) signal to the receiver RX. During that time period, the system controller 136 of the transmitter TX monitors the count of the timer 146. The count indicates the spent communication time period and when it reaches a predetermined reference value, which is set slightly short of a predetermined time period T, the system controller 136 determines whether or not any original document 300 remains at the reading unit 116. This determination is carried out by reading an output from the sensor 320 of the reading unit 116 at that time by the system controller 136 and then judging whether or not the output indicates the presence of the original document 300 at the location P1. The above-mentioned reference value is so set to provide a necessary length of time for carrying out the termination processing including a step of transmission of an EOP1 signal which will be described later.

If it has been determined by the detector 320 that there is no remaining message or the original document 300 is not longer than a predetermined length, the system controller 136 continues transmission of a message being transmitted until its end thereof. That is, the image information of the original document 300 is read by the reading unit 116 until the trailing edge 330 thereof and transmitted. Upon completion of this transmission, the system controller 136 of the transmitter TX carries out an ordinary termination processing. That is, an EOP signal is transmitted to the receiver RX, and, in response thereto, the receiver RX transmits an MCF signal to the transmitter TX. Upon detection of the MCF signal, the transmitter TX transmits a DCN signal to the receiver RX. These steps are carried out within the remaining time period.

On the other hand, if it has been determined by the detector 320 that the original document 300 has a length beyond a predetermined level, the system controller 136 discontinues transmission of this message information and then carries out a termination processing, including, for example, a step of transmitting an EOP1 signal different from the EOP signal in the ordinary termination processing, and ultimately the call connection is restored. In this case, the system controller 136 controls the pulse motor controller 138 to have the pulse motor 132 brought to a halt, so that the original document 300 being optically read is caused to remain in the reading unit 116 as it is with the second half portion 300b left not read. Under the circumstances, when the operator operates the retransmission switch 142 of the operating unit 140, the system controller 136, in response thereto, carries out a recalling control operation, whereby the identification data of the receiver stored in the dial memory 150 is transferred to the dial transmitter 152, thereby carrying out the above-described calling operation again. In addition, the line density set value stored in the operation memory 144 is transferred to the pulse motor controller 138. The subsequent operation will proceed in a manner similar to that described with respect to establishment of connection or facsimile communication route between the transmitter TX and the receiver RX.

Upon completion of MODEM training after reestablishment of communication connection between the transmitter TX and the receiver RX, in a manner similar to the case of transmission of source of transmission information, the system controller 136 controls the image signal converter 124 and the character generator 126 to transmit the before-mentioned additional information, i.e., information indicating to transmit a message which corresponds to the latter half portion 300b of the original document 300. This information is generated as a character series data by the character generator 126, converted into an image information pattern by the image signal converter 124 and transmitted to the receiver RX. When received by the receiver RX, this information is recorded on a sheet of recording paper similarly with ordinary image information.

As is obvious from the above description, in accordance with this aspect of the present invention, the operator manipulates the numeric keys to input the identification number, such as telephone number, of the destination station or receiver RX at the time when a connection between the transmitter TX and the receiver RX is to be established for the first time; however, in any subsequent reconnections for transmission of the remaining image data of the same original document, it is only necessary to operate the retransmission switch 142. Accordingly, the operation for retransmission or subsequent transmission of the remaining image data of the same original document is extremely facilitated. Alternatively, instead of providing the retransmission switch 142 in the operating unit 140, it may be so structured that a retransmission command is input by using numeric keys to transmit the remaining portion 300b of the original document 300 to the same receiver RX.

In the above-described embodiment, it has been described as to the G3 standard facsimile communication procedure according to the CCITT recommendations, it goes without saying that the present invention can be applied to any other communication procedures, such as G2 facsimile communication procedure. In addition, the present invention may be advantageously applied not only for restoration of communication line after elapsing a predetermined communication time period, but also for any communication system which has a possibility of discontinuing communication leaving a portion of the original document not read and thus not transmitted.

In the above-described embodiment, the image information of the original document 300 is directly read by the reading unit 116 and transmitted. However, the present invention is also applicable to a facsimile machine which once stores image information in a memory and then the thus stored information is transmitted sequentially at a predetermined unit. In this case, the remaining amount of the image information to be transmitted can be determined by monitoring the address of the memory from which the information is read out. That is, by comparing the final address of the information stored in the memory and the address from which the information is being read out, the amount of the remaining image information to be transmitted can be determined. It may be so structured that the front or start address of this remaining image information in the memory is retained when discontinuance of transmission happens and the transmission of the remaining image information is initiated from that address upon resumption of communication.

In accordance with another aspect of the present invention, there is provided a data communication apparatus suitable for use in a data communication system having a predetermined communication time period, wherein if the presence of remaining image information to be transmitted is detected upon discontinuance of communication and then the communication is resumed, the image information immediately preceding the remaining image information is transmitted prior to the transmission of the remaining image information. This aspect of the present invention is very similar in structure to the previously described embodiment in many respects, and it has an overall structure as shown in FIG. 1. Similarly with the previously described embodiment, when the communication is discontinued during transmission of original information, the original document is left as it is in the reading unit 116 with the remaining image information not read and thus not transmitted. However, in accordance with this aspect of the present invention, in the case of transmitting the remaining portion of the original document, the original document held in the reading unit 116 is moved backward over a predetermined amount, and, then, the original document is again moved forward, thereby optically reading and transmitting the image information of the original document. In this case, similarly as the previously described embodiment, the same destination station is automatically called to establish a transmission line and the communication conditions are also automatically set.

Figure 7:
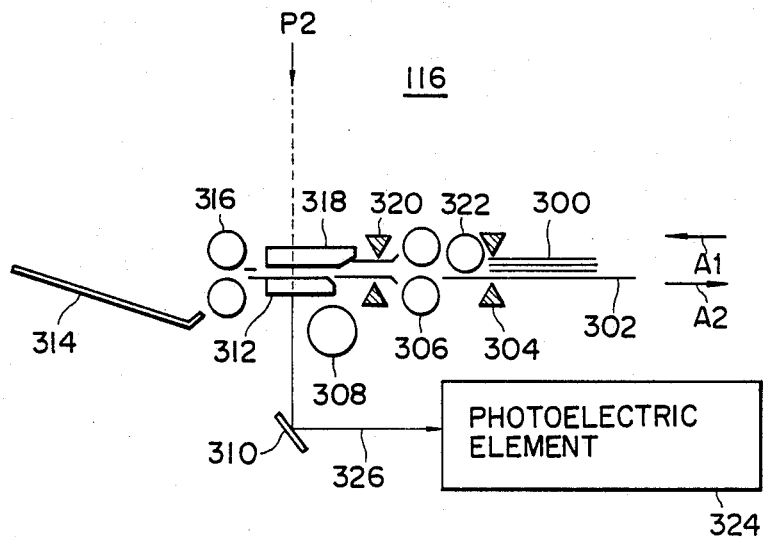
Figure 8:
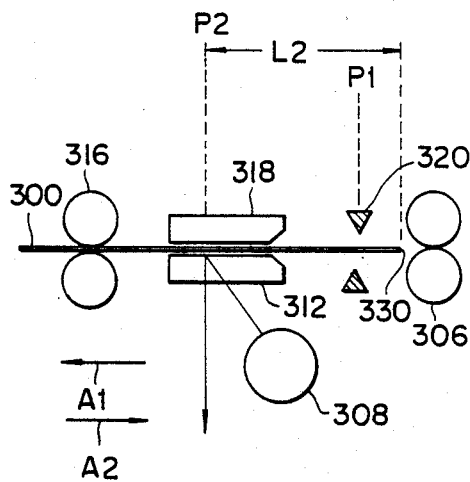
Figure 9:
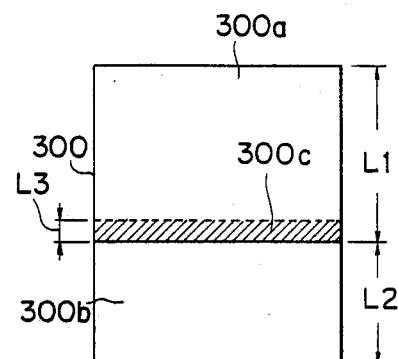

Described by way of an embodiment more in detail as to this aspect of the present invention, the original documents 300 stacked on the supply tray 300 are picked up one by one by the pick-up roller 322 and then transported by the transporting roller 306 which is driven by the pulse motor 132. Thus, as shown in FIGS. 7 and 8, the original document 300 is moved forward or in the direction indicated by the arrow A1 under normal condition. On the other hand, at the time of retransmission after disconnection of communication, the transporting roller 306 is driven in the reversed direction so that the original document 300 is moved backward or in the direction indicated by the arrow A2 over a predetermined amount. With this structure, as shown in FIG. 9, prior to transmission of the remaining portion 300b after disconnection of communication, for example, because of expiration of a predetermined communication time period, the original document 300 is moved backward, or in the direction indicated by A2, over a predetermined length L3, and, then, the original document 300 is moved forward to optically read and transmit the image information of the original document 300. Thus, the trailing portion 300c of the first half portion 300a of the original document 300 is transmitted once more prior to the transmission of the remaining portion 300b. Thus, the shaded portion 300c is transmitted twice. In this case, the overlapping portion 300b may be recorded on the same sheet of paper on which the first half portion 300a has been recorded, or, alternatively, it may be recorded on another sheet of paper.

The operation of this embodiment is also similar to that of the previously described embodiment; however, there are some differences because the original document 300 must be pulled backward over a predetermined distance prior to transmission of the remaining image information on the same original document. That is, in a manner similar to the above-described embodiment, when the retransmission switch 142 of the operating unit 140 is operated with the original document 300 held in the reading unit 116 half read, the system controller 136 carries out a call procedure again in response thereto, whereby the selection signal of the receiver stored in the dial memory 150 is transferred to the dial transmitter 152. During the transmission of this selection signal, the system controller 136 supplies a command to the pulse motor controller 138 to have the pulse motor 132 driven to rotate in the reversed direction, thereby driving to rotate the transporting roller 306 in the reversed direction. As a result, the original document 300 is moved backward in the direction indicated by the arrow A2 over a predetermined length L3.

Figure 6:
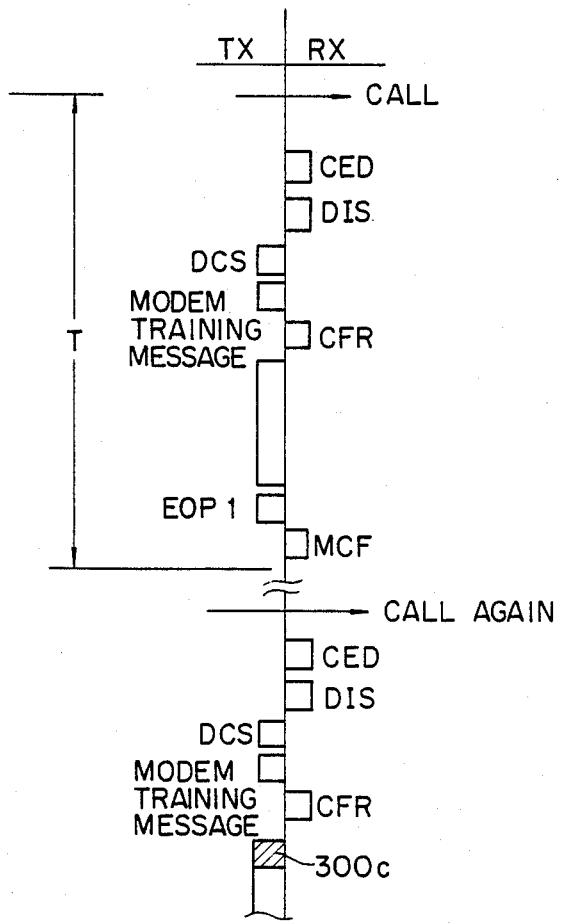
FIGS. 6 through 9 are schematic illustrations which are useful for explaining another embodiment which is a modification of the embodiment shown in FIGS. 1 through 5.

When the connection between the transmitter TX and the receiver RX is reestablished in this manner and the MODEM training is completed, the image information of the trailing portion 300c of the first half portion 300a is transmitted at the beginning of a message signal, as shown by the shaded block in FIG. 6. Alternatively, it may also be so structured that the movement of the original document 300 in the reversed direction is effected during implementation of the communication control procedure upon completion of establishment of connection to the receiver. In either case, the original document 300 is moved in the reversed direction indicated by the arrow A2 under the control of the system controller 136 between the time when the retransmission switch 142 has been operated and the time when the transmission of message information is started.

As described above, in accordance with this aspect of the present invention, it is so structured that the trailing portion 300c of the immediately preceding portion of the original document is retransmitted prior to the transmission of the succeeding portion of the original document. The trailing portion 300c is thus transmitted twice and the length L3 of this trailing portion 300c is typically so set to cover at least a few lines. With such a structure, the operator at the receiver RX can easily determine whether or not any image information has been lost or which portion of one of the received images should be combined with which portion of another received image.

Figure 10:
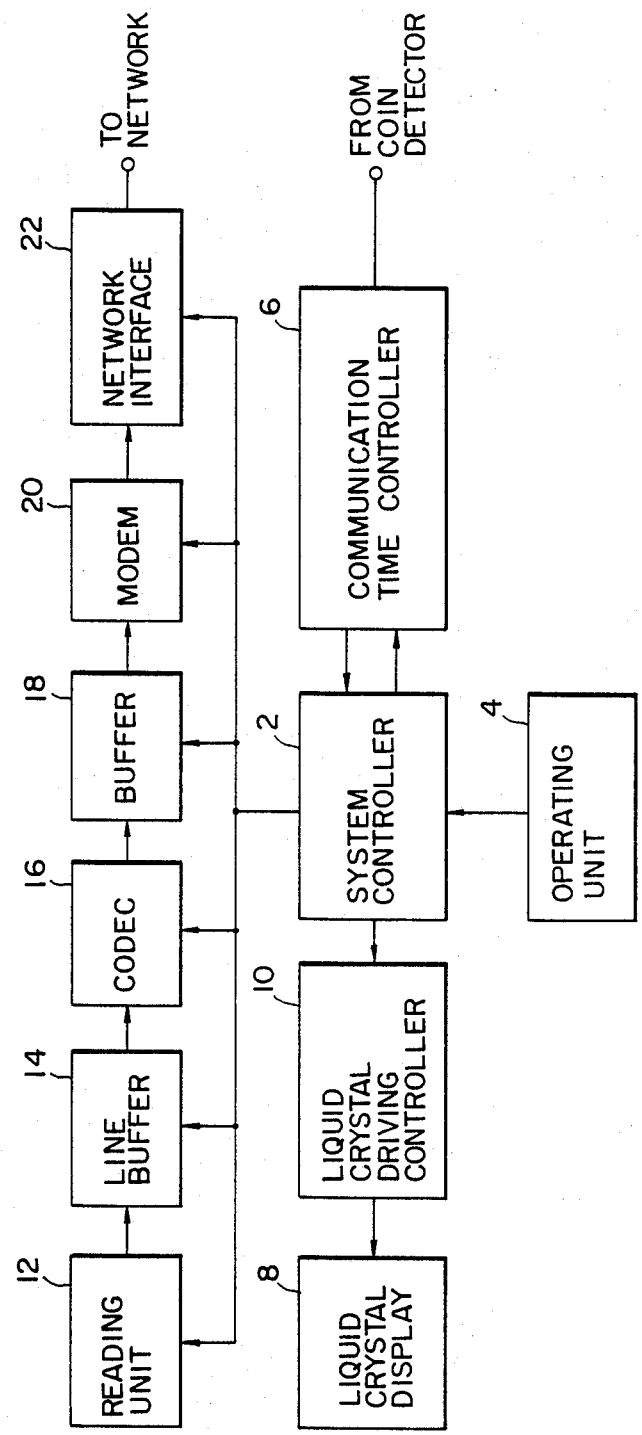
FIG. 10 is a block diagram showing the structure of a transmission section of a facsimile machine having a remaining transmission time display device constructed in accordance with one embodiment of the present invention.
Figure 11:
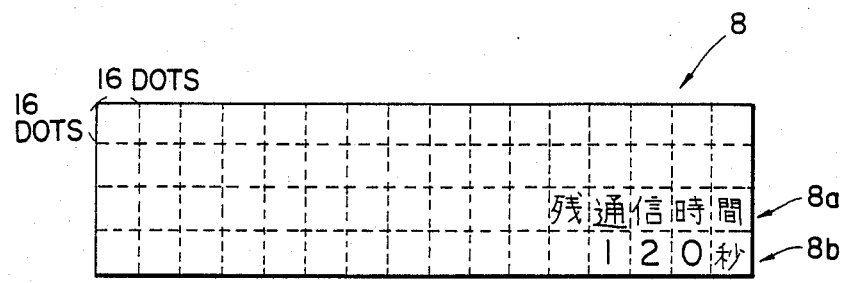
FIG. 11 is a schematic illustration showing one example of display in the display device provided in the structure shown in FIG. 10.

Now, a further aspect of the present invention will be described with reference to FIGS. 10 through 12. This aspect of the present invention relates to a display device capable of displaying the remaining time period during which a facsimile machine can transmit image data through a time limited communication network system. That is, for example, when a facsimile machine is used in the form of a public pay telephone, an audio time limit warning signal, which is produced shortly before the expiration of a predetermined communication time period determined by the amount of money calculated from deposited coins or an inserted card, is of no use to the facsimile machine because the facsimile machine is not equipped with a function to handle the audio signal. Thus, the operator cannot determine the remaining amount of time period for communication.

This aspect of the present invention is directed to obviate such a disadvantage and to provide a display device which displays the remaining amount of time for communication allowed for a pay facsimile machine. Referring now to FIG. 10, there is shown in block form the transmitter section of a pay facsimile machine provided with a remaining communication time period display device constructed in accordance with one embodiment of the present invention. As shown, the present facsimile machine includes a reading unit 12, a line buffer 14, a CODEC 16, a buffer 18, a MODEM 20, a network interface 22, a system controller 2 for controlling these elements, an operating unit 4 for providing various operational instructions by the operator, a communication time controller 6 connected to the system controller 2, a liquid crystal display 8 and a liquid crystal driving controller 10.

The reading unit 8 optically reads an original document to be transmitted. In this case, the reading unit 8 typically includes an image sensor comprised of a plurality of photoelectric elements arranged in the form of an array extending in the direction transverse to the direction of transportation of the original document. The direction of transportation is often called the auxiliary scanning direction and the direction of optical scanning, i.e., the longitudinal direction of the image sensor, is often called the optical or main scanning direction. Thus, as the original document is transported continuously, it is optically read line by line by the reading unit 12 at a predetermined pitch. The line buffer 14 stores a line of image data read from the original document, and this line of image data is transferred to the CODEC 16 where the image data is encoded according to a predetermined encoding method. The thus encoded image data is then temporarily stored into the buffer 18. The image data read out of the buffer 18 is then modulated by the MODEM 20 and the thus modulated image signal is then output to the communication network through the network interface 22.

The communication time controller 6 includes a coin detector having a well known structure (not shown) which identifies and counts the number of coins deposited into the coin detector by the operator, and calculates the total amount of money equivalent to all of the deposited coins. The communication time controller 6 may also have a card reader which, when a telephone card is inserted, reads the remaining amount of money recorded on the telephone card. In addition, the communication time controller 6 receives the identification number, such as telephone number, of the destination station as input by the operator using, for example, the numeric keys provided at the operating unit 4, determines an geographical area of the destination station so as to select a suitable table for calculating a communication time period based on the amount of money deposited by way of coins or telephone card and supplies the thus calculated communication time period to the system controller 2.

The system controller 2 is preferably comprised of a microcomputer or the like and it carries out a predetermined processing based on the identification number of the destination station and other required data input by the operator through the operating unit 4 and controls the various components. In addition, the system controller 2 processes the data of communication time period supplied from the communication time controller 6. That is, the elapsing time from the initiation of communication is counted and the counted time period is subtracted from the communication time period supplied from the communication time controller 6, whereby the remaining communication time period is determined. The thus obtained data of the remaining communication time period is then supplied to the liquid crystal driving controller 10, thereby causing the data to be displayed at the liquid crystal display 8.

Alternatively, it may be so structured to calculate the remaining communication time period by the communication time controller 6. In this case, at the communication time controller 6, the communication time period is calculated based on the coins deposited or telephone card inserted by the operator and the identification number of the destination station input by the operator, as well as monitoring the time which has elapsed from the initiation of communication and subtracting the elapsed time from the communication time period to determine the remaining communication time period. The communication time controller 6 supplies this data of remaining communication time period to the system controller 2 which in turn transfers the data to the liquid crystal driving controller 10, thereby causing the data to be displayed at the liquid crystal display 8.

Figure 12:
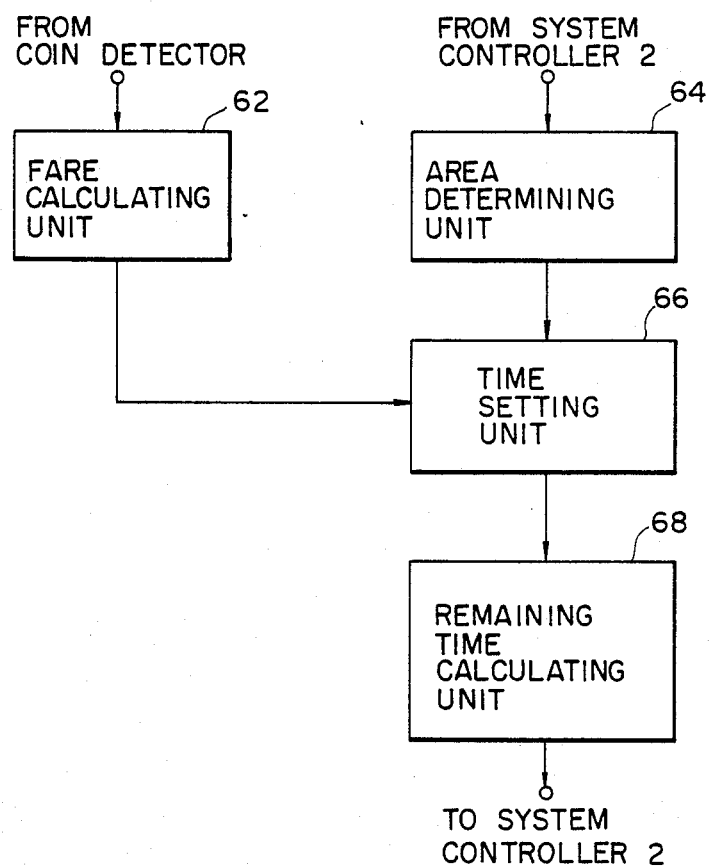
FIG. 12 is a functional block diagram showing a sequence of steps to be carried out at the communication time controller in the structure shown in FIG. 10.

FIG. 12 shows in functional block form the structure of the communication time controller 6. The illustrated embodiment relates to the case in which the remaining communication time period is calculated at the communication time controller 6. As shown in FIG. 12, a fare calculating unit 62 includes a well-known coin detector (not shown) for detecting and identifying each coin deposited and calculates the total amount of money deposited. An area determining unit 64 receives the identification number, such as telephone number, of the destination station, which has been input by the operator using the numeric keys provided at the operating unit 4, thereby selecting an area for fare calculation. A time setting unit 66 receives the data of total amount of deposited money from the fare calculating unit 62 and the selected area of the destination station from the area determining unit 64, and, based on these data, it determines a communication time period under the given conditions. If the operator has deposited additional one or more coins after initiation of communication, the fare calculated by the fare calculating unit 62 increases, so that the communication time period set by the time setting unit 66 is modified to increase correspondingly. The communication time period thus set is supplied to a remaining time calculating unit 68 which calculates the remaining communication time period by subtracting the time which has elapsed from the initiation of communication from the communication time period supplied from the time setting unit 66 and supplies as its output to the system controller 2.

The liquid crystal driving controller 10 outputs a control signal for driving the liquid crystal display 8 in accordance with a signal output from the system controller 2. As shown in FIG. 11, the liquid crystal display 8 may have a display area of 64 dots by 256 dots, and each character may be displayed by 16 dots by 16 dots. Each character is, for example, displayed using a character generator. In the particular example shown in FIG. 11, the words "remaining communication time" are displayed in Kanji (Chinese characters) in the second row from the bottom as indicated by 8a and the data of the remaining communication time (120 seconds in the illustrated example) is displayed as a combination of number and Kanji in the bottom row as indicated by 8b. It is to be noted that the number "120" is displayed right after deposition of a coin and this number is decremented consecutively, such as "119", "118", etc., every second.

If the operator deposits one or more coins additionally, then the communication time period is extended corresponding to the amount of coins deposited, so that the data of the remaining communication time displayed is also increased correspondingly. Described more in detail in this respect, the communication time period is extended in accordance with the amount, such as number, of coins additionally deposited, and this extended communication time period is supplied to the system controller 2, where the remaining communication time is also extended, and the extended data is supplied to the liquid crystal display 8 through the liquid crystal driving controller 10. Alternatively, in accordance with the amount of additionally deposited coins, the remaining communication time is extended at the communication time controller 6, and this extended data is then supplied to the system controller 2, from where the data is supplied to the liquid crystal display through the liquid crystal driving controller 10.

Alternatively, it may also be so structured that the data of the remaining communication time is displayed at the liquid crystal display 8 only when the data has reached a predetermined value, such as 10 seconds. In this case, the system controller 2 may supply its control signal to the liquid crystal driving controller 10 when the remaining communication time has reached a predetermined value, such as 10 seconds. Although not shown, use may be made of light-emitting diodes in place of the liquid crystal display 8. Alternatively or in addition, a warning device for providing an audio warning signal indicating the fact that the remaining communication time is approaching to zero may be provided. In this case, it may be so structured that the audio warning signal is generated when the remaining communication time has reached a predetermined value, such as 10 seconds. Besides, it may also be so structured that the audio warning signal is continuously generated after reaching a predetermined value with or without a gradual increase in intensity as the remaining time becomes even smaller.

In accordance with a still further aspect of the present invention, there is provided a data communication apparatus suitable for use in a data communication system in which various control signals, such as a time-out warning signal indicating the approaching the end of a predetermined communication time period, are produced. As described previously, in a time limited data communication system, such as a public pay telephone system, the length of time during which the caller is allowed to carry out communication is limited depending on the amount of money deposited by way of coins or a telephone card. And, when the remaining communication time period reaches a predetermined point shortly before the end of the period, an audible warning signal is supplied to the caller. Hearing such a warning signal, if the caller deposits an additional amount of money, the allotted communication time period is extended by a corresponding time period. If no additional deposit is made, then the connection is disconnected upon expiration of the allotted time period automatically.

As noted before, there has been proposed a pay facsimile machine similar in use to a pay telephone. In such a pay facsimile machine, the facsimile machine is connected to a public telephone network only for a time period which corresponds to the amount of money deposited by the user prior to connection. In this case, since the above-described warning signal is produced, for example, from a central station in charge of the network, such a warning signal will be superimposed on the facsimile information signal. This will cause disturbances in the image signal transmitted to the receiver. Or, upon detection of such disturbances, the receiver might determine the occurrence of errors and cause the connection to be disconnected. In this case, the operator at the receiver could not determine the cause of the disconnection.

Figure 15:
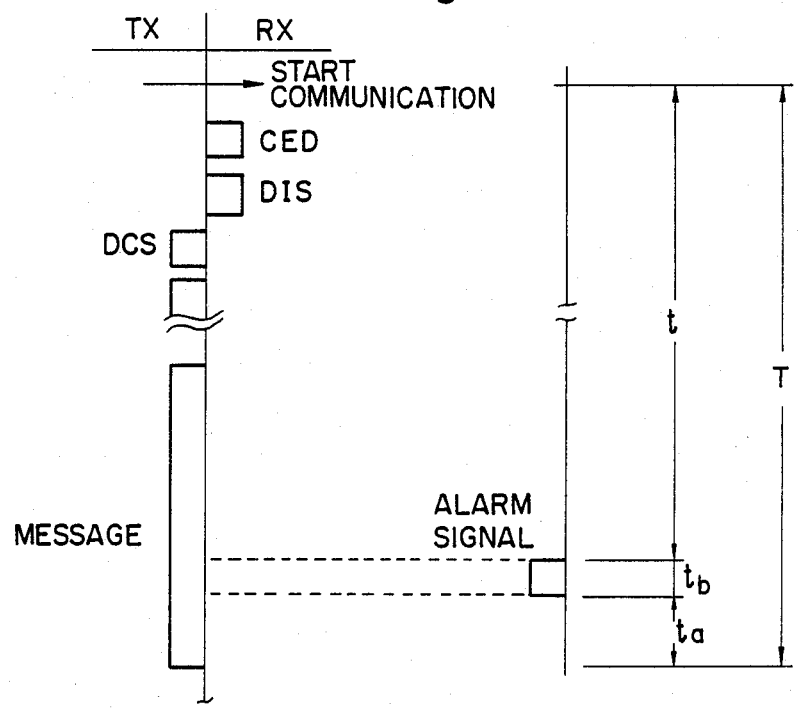
FIG. 15 is a schematic illustration showing a sequence of steps in carrying out a typical facsimile communication following the G3 facsimile transmission control procedure of the CCITT recommendations using the apparatus shown in FIG. 13.

This aspect of the present invention is directed to obviate the above-described disadvantages and to provide a data communication apparatus which is not adversely affected by various control signals, such as a time-out warning signal, transmitted through the network. As shown in FIG. 15, when a time period t has elapsed after initiation of facsimile communication between the transmitter TX and the receiver RX, a warning signal is generated, for example, from an exchange station for a warning time period $t_b$. Thereafter, if no additional deposit of coins is made, the connection will be disconnected after elapsing a time period $t_a$. In the prior art facsimile machine, when the warning (alarm) signal is received, an error processing will be carried out to have the connection disconnected, though communication can be still made during the final time period $t_a$. This aspect of the present invention is directed to obviate such disadvantages and to utilize the entire communication time period T efficiently. In accordance with the principle of this aspect of the present invention, even if various control signals, such as a warning or alarm signal, are received while message information is being received at the receiver, no error processing is carried out and thus the connection is not disconnected. While a control signal, such as a time-out warning signal, is being received, the message information cannot be received properly; however, during the time period of such a control signal, a character generator provided in the receiver is activated to have a predetermined indication recorded on a sheet of paper or displayed at a display device. Thereafter, upon termination of the control signal, the message information is properly received till the end of the allotted communication time period. With this structure, the operator at the receiver can recognize that a portion of the received message is not properly received due to the inclusion of a certain control signal, such as a time-out warning signal.

Referring now to FIG. 13, there is shown in block form a facsimile machine 400 constructed in accordance with one embodiment of the present invention. As shown, the facsimile machine 400 includes a network interface 430, through which the facsimile machine 400 is connected to the outside network, which may be a MCA communication network or a public telephone network. In such a network, a communication time period is limited to a unit time period and the length of the communication time period is determined depending on the amount of money deposited by way of coins or a card. Thus, a time-out warning signal is normally supplied to the user, for example, from the central control station of the network when the end of the communication time period approaches. It should be noted, however, that the principle of the present invention is also applicable to a communication network with or without wire, which has no limitations in the length of communication, if one or more control signals is supplied to the network superposingly during communication.

A signal line 402 extends from the network interface 430 to a CODEC 408 through a MODEM 404 and a buffer 406. The buffer 406 has a function of a memory for temporarily storing facsimile data to be transmitted and received. The MODEM 404 modulates a facsimile signal to be transmitted in accordance with a predetermined modulation method and demodulates a received facsimile signal. The CODEC 408 arranges the facsimile signal to be transmitted in the form of predetermined frames and compresses the signal according to a predetermined encoding method; on the other hand, the CODEC 408 deframes the received facsimile signal and reconstructs the original or decoded signal. At this time, normality check of a received signal, such as CRC check, is also carried out.

An original document to be transmitted is optically read by a reading unit 416 which includes a plurality of photo-electric elements arranged in the form of a single array. Thus, the original document is optically read by the raster scanning method line by line as the original document is moved relative to the reading unit 416. The image data thus read from the original document is once stored into a line buffer 418, and the image data is then supplied to the CODEC 408. The image data is then transferred to the buffer 406 through a switch SW1 provided in the CODEC 408. On the other hand, received facsimile data is also once stored in the buffer 406 and then it is supplied to a line buffer 420 through a switch SW2 provided in the CODEC 408. The received image data stored in the line buffer 420 is then supplied to a recording unit 422 which, for example, is comprised of a thermal printhead and which records the received image data on a sheet of recording medium 500 (FIG. 16) as a hard copy. Although no mechanism for transporting the sheet of recording medium 500 is shown, the recording medium 500 may be transported along a predetermined path, for example, by driving a pulse motor under the control of the system controller 436. Of course, the recording unit 422 may include a display unit, such as a CRT, if desired.

The switch SW1 includes a transmission terminal S and a character output terminal C which is connected to a corresponding terminal of the switch SW2 and also to an image signal converter 424. The switch SW2 also includes a reception terminal R which is connected to the pointer of the switch SW1 and also to the buffer 406. The switches SW1 and SW2 are controlled by a system controller 436 which will be described in detail later. The image signal converter 424 is connected to a character generator 426 and it is a circuit for converting the character pattern generated from the character generator 426 into an image signal. In the case of transmitting a character data generated in the present apparatus 400 through the network interface 430, an output from the image signal converter 406 is transferred to the buffer 406 through the switch SW1; whereas, in the case of outputting a character data generated within the present apparatus 400 to the recording unit 422, an output from the image signal converter 424 is transferred to the line buffer 420 through the switch SW2. The character generator 426 may be comprised of an ordinary character generator which generates a character pattern data in response to a signal supplied from the system controller 436.

The signal line 402 is also connected to an alarm signal/intermediate signal detector 456 which detects the presence of various control signals, such as an alarm signal or an intermediate signal, which are included in the signal received by the network interface 430 from the network. Such a detection of various control signals is preferably carried out on the basis of frequency of such signals. When the presence of one of such control signals as superimposed on the signal received by the network interface 430 from the network, the detector 456 notifies this fact to various components, including system controller 436. Thus, an output 458 from the detector 456 is coupled to the system controller 436. It is to be noted that such a function may be advantageously incorporated into the network interface 430, or, alternatively, the detector 456 may be directly connected to the network as indicated by the dotted line 432 so as to detect the presence of various control signals directly. The various functions and operations of the present apparatus 400 are controlled by the system controller 436 integrally, and it is preferably comprised of a microprocessor or the like.

As shown in FIG. 15, the communication time period T has a length which is determined by the amount of money deposited by the user by way of coins or a card. During transmission of an image information signal (FIG. 14a), when a time period t has elapsed and thus the end of the communication time period T approaches, an alarm signal (FIG. 14b) having a particular frequency is supplied to the receiver, for example, from the central control station of the network for a time period of $t_b$. Thus, normally, this alarm signal is superimposed on the image information in transmission. Thereafter, during the remaining time period $t_a$, the user can receive the image information properly without disturbances by the alarm signal; however, during the warning time period $t_b$, the image signal cannot be properly received because the image signal is disturbed by the alarm signal.

At the receiver RX, the presence of such an alarm signal in the signal received at the network interface 430 is detected by the detector 456. Upon such detection, the detector 456 notifies this fact to the system controller 436 by way of a detection signal as shown in FIG. 14c. Upon receipt of this detection signal, the system controller 436 activates the character generator 426 and causes the switch SW2 of the CODEC 408 to be connected to the terminal C. Thus, a character pattern data output from the character generator 426 is converted into an image data by the image signal converter 424, which replaces that portion of the received image information signal that has been disturbed by the alarm signal. The character image data is thus supplied to the recording unit 422 during the time period $t_b$ so that a predetermined character is recorded on the recording medium 500 at 502 over a length L3 which corresponds to the time period $t_b$. Upon termination of the alarm signal, the image information signal is again properly received till the end of the communication time period T.

As described above, in accordance with the principle of the present invention, during the time period $t_b$, the normality check for the received signal at the CODEC 408 is deactivated by the system controller 436, so that no error processing function is effected during this time period. Accordingly, the present facsimile apparatus 400 disregards that portion of the received image information signal which corresponds in time to the alarm signal. However, since the alarm time period $t_b$ is relatively short, this would present no practical problem.

Figure 16:
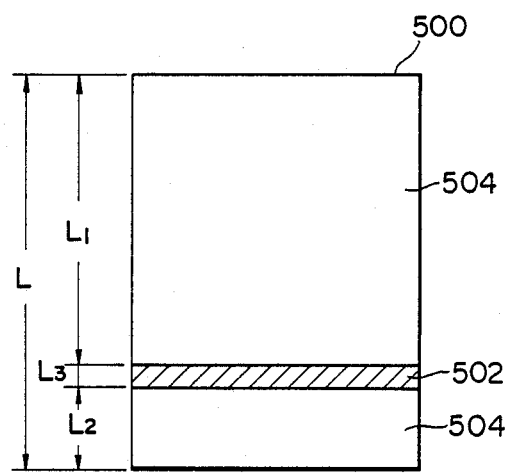
FIG. 16 is a schematic illustration showing an example of recording facsimile information using the recording section of the structure shown in FIG. 13.

In general, in a facsimile machine, the determination of whether received image information is proper or not is carried out by various ways, such as CRC check or checking of line error at the time of decoding, and, upon detection of an error, it is so controlled to disconnect the subsequent communication. In accordance with the present embodiment, when an alarm signal is detected by the detector 456, the system controller 436 controls to deactivate such a checking function for a predetermined time period. As a result, the received image information is recorded on two separate portions 504 and 504 as shown in FIG. 16, with the first portion 504 having a length L1 corresponding to time t and the second portion 504 having a length L2 corresponding to time $t_a$. The intermediate portion 502 is not recorded with the received image information but with a predetermined character data, as described before.

As indicated by the one-dotted line 434 in FIG. 13, it may also be so structured that the output from the image signal converter 424 is supplied to the buffer 406. In this case, that portion of the received image information now stored in the buffer 406 is replaced by the character image data output from the image signal converter 424 at its storing location. In this case, however, the character image data must be encoded at the image signal converter 424 using the same encoding method applied to the image information signal stored in the buffer 406 before being supplied to the buffer 406.

The information to be recorded in the intermediate portion 502 of the recording medium 500 is not the information transmitted from the transmitter through the network, but is the information produced at the receiver upon detection of the alarm signal. Thus, the information to be recorded in the intermediate portion 502 is already known to the operator at the receiver, so that the operator can recognize the fact of approaching the end of communication by seeing the recording of this intermediate portion 502.

With particular reference to FIG. 15, the facsimile communication operation of the present apparatus 400 for transmitting a plurality pages of original documents in accordance with the G3 facsimile communication control procedure of CCITT recommendations will be described below. In this example, the present apparatus 400 will serve as a receiver, and the transmitter may be comprised of the same apparatus or some other apparatus.

In the first place, in accordance with the instructions of the operator, the transmitter TX calls the receiver RX. This calling step is carried out by sending a calling signal if it is an automatic mode. Upon detection of this calling signal, the receiver RX transmits a CED (Called Station Identification) signal and then a DIS (Digital Identification) signal to the transmitter TX. In the case of manual mode, the calling by the transmitter TX is carried out by an audio signal, and the receiver RX responds to this call by the operation of an operating button. Upon detection of these CED and DIS signals, the transmitter TX transmits a DCS (Digital Command) signal to the receiver RX. Thereafter, in accordance with an ordinary facsimile communication control procedure, a predetermined MODEM training pattern signal is transmitted to the receiver RX, thereby carrying out the training of the MODEM 404 of the receiver RX. Upon completion of the training of the MODEM 404 at the receiver RX, the system controller 436 transmits a CFR (Confirmation of Reception Preparation) signal to the transmitter TX, thereby setting ready to receive an image information message.

At the transmitter TX, upon reception of the CFR signal, the system controller 436 causes the switch SW1 of the CODEC 408 to be connected to its S terminal, thereby controlling the reading unit 416 to initiate the reading of an original document. The image information or message read from the original document is then compressed by coding as being processed through the line buffer 418, OCDEC 408, buffer 406 and MODEM 404, arranged in the form of transmission frames, modulated and sent out to the network through the network interface 430.

At the receiver RX, on the other hand, this message is received by the network interface 430 and the received message is demodulated by the MODEM 404, deframed by the CODEC 408 and finally recorded on the recording medium 500 by the recording unit 422. In general, at the beginning of recording, the transmitter identification and the date and time of transmission is recorded.

In this manner, in accordance with the present embodiment, a unit of information, i.e., an image information message for a single page, is transmitted from the transmitter TX. If there is no next original document to be transmitted, then the transmitter TX carries out a termination processing to transmit an EOP (End of Procedure) signal, and, the receiver RX returns an MCF signal in response thereto. Upon receipt of this MCF signal, the transmitter TX transmits a DCN (Disconnection Command) signal to the receiver RX.

In the meantime, for example, the central control station of the network keeps monitoring the elapsing of the communication time period. When the predetermined time period t has elapsed, the central control station supplies an alarm signal to the network. At the receiver RX, the reception of this alarm signal superimposed on the image information signal will be detected by the detector 456. Upon detection, the detector outputs a detection signal, and, in response thereto, the character generator 426 is activated and the switch SW2 of the OCDEC 408 is connected to the terminal C. Under the circumstances, the character generator 424 is operated to output a character data which is then processed through the image signal converter 424, which thus outputs a character image data. The output from the image signal converter 424 is then supplied to the recording unit 422 to be recorded on the recording medium 500 at the intermediate portion 502.

As described before, the system controller 436 of the receiver RX deactivates its received signal normality check function for a predetermined time period upon receipt of the detection signal from the detector 456. Upon termination of the detection signal, the system controller 436 returns to normal operating condition, so that the received image information is processed and recorded in an ordinary manner for the remaining time period $t_a$.

For example, when an alarm signal is received during receipt of a message, the output data 502 is recorded on the recording medium 500 as shown in FIG. 16 at the receiver RX. As described previously, this portion 502 is recorded with an image data created at the receiver RX upon detection of the time-out alarm signal. In FIG. 16, L indicates the total length of the original image.

It has been described for the case in which the G3 standard facsimile communication procedure according to the CCITT recommendations is applied to the present invention. It is to be noted, however, that various other facsimile and data communication procedures, such as G2 facsimile communication control procedure, are also applicable to the present invention. Besides, in the above-described embodiment, the detection of a time-out alarm signal is detected by the detector 456; however, it may also be so structured to detect such an alarm signal by the system controller 436. It should be noted that this aspect of the present invention is also applicable to any type of communication system with or without limitation for the length of communication as long as one or more of control signals are generated in the network during transmission of a data signal.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A data communication apparatus for use in a communication system which automatically disconnects a connection between a transmitter and a receiver upon expiration of a communication time period, comprising:
    reading means for reading an original document to produce an image data;
    transmitting means for transmitting said image data;
    detecting means for detecting the presence of a remaining portion of said image upon occurrence of said disconnection; and
    means responsive to said detecting means for reestablishing a connection between said transmitter and said receiver for transmitting said remaining portion of said image data by said transmitting means.

2. The apparatus of claim 1 further comprising transporting means for transporting said original document along a predetermined path in which said reading means is disposed, said transporting means being brought to a halt upon occurrence of said disconnection.

3. The apparatus of claim 2 wherein said reading means includes an image sensor comprised of a plurality of photoelectric elements arranged in the form of a single array, whereby said original document is optically read in the format of raster scanning line by line.

4. The apparatus of claim 1 wherein said system includes means for determining a length of said communication time period depending on an amount of money deposited by an operator.

5. The apparatus of claim 1 further comprising: setting means for setting various communication conditions for transmitting said image data; and storing means for storing said various communication conditions set by said setting means, whereby said controlling means reestablishes a connection between said transmitter and said receiver based on the conditions stored in said storing means for transmitting said remaining portion of said image data by said transmitting means after occurrence of said disconnection when resumption of transmission is requested.

6. A data communication apparatus for use in a communication system which automatically disconnects a connection between a transmitter and a receiver upon expiration of a communication time period, comprising:
- reading means for reading an original document to produce an image data;
- transmitting means for transmitting said image data;
- detecting means for detecting the presence of a remaining portion of said image data upon occurrence of said disconnection; and
- means responsive to said detecting means for reestablishing a connection between said transmitter and said receiver for transmitting a trailing portion of said image data immediately preceding said remaining portion and then said remaining portion of said image data by said transmitting means.

7. The apparatus of claim 6 further comprising transporting means for transporting said original document along a predetermined path in which said reading means is disposed, said transporting means being brought to a halt upon occurrence of said disconnection.

8. The apparatus of claim 7 wherein said transporting means causes said original document to move backward over a predetermined distance before causing said original document to move forward when said transporting means is driven after occurrence of said disconnection.

* * * * *